C. F. HATHAWAY.
SQUARE HOLE DRILL CHUCK.
APPLICATION FILED AUG. 15, 1916.
1,299,938.
Patented Apr. 8, 1919.
2 SHEETS—SHEET 1.
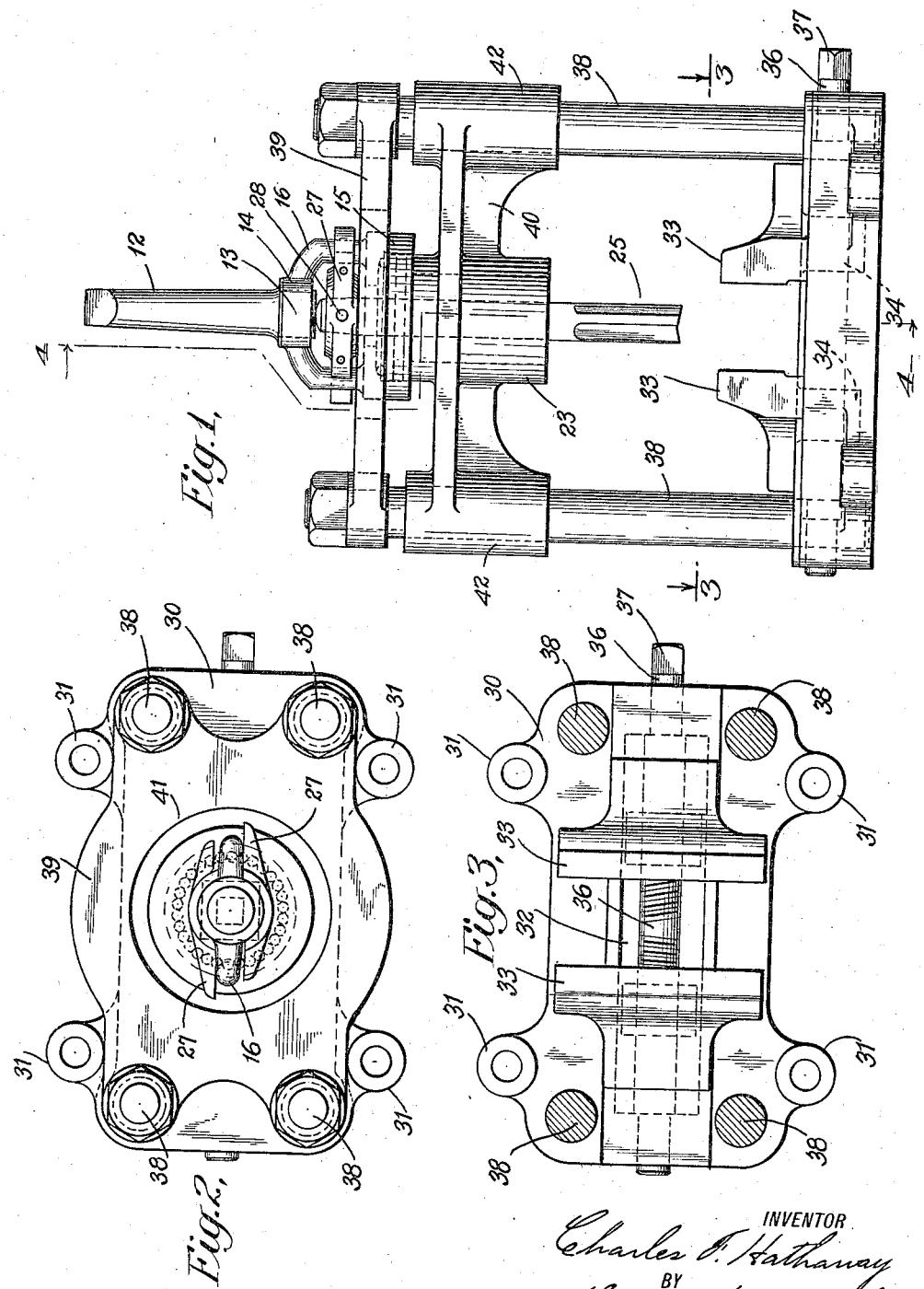
INVENTOR
Charles F. Hathaway
BY
E. W. Marshall
ATTORNEY

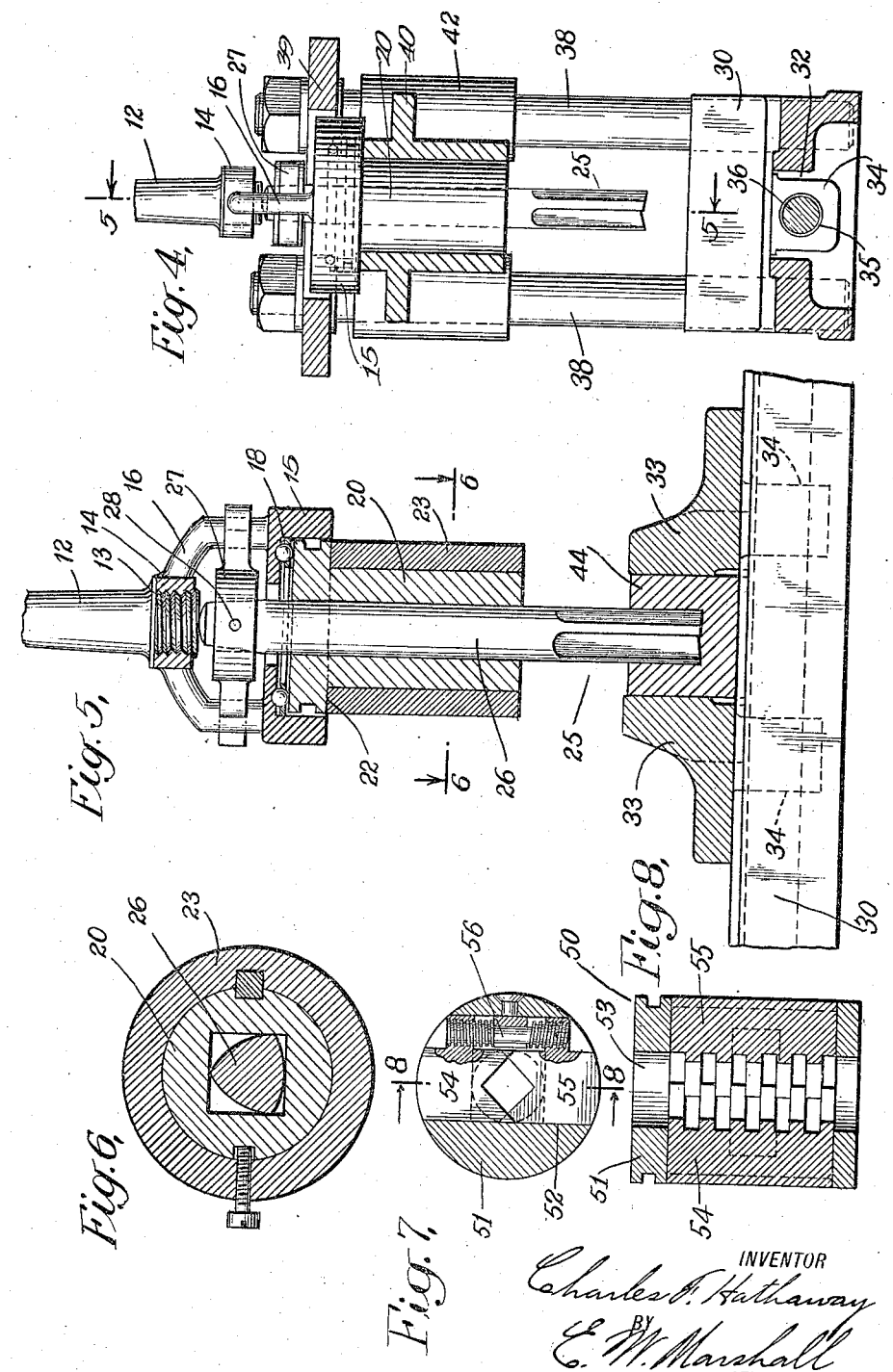

UNITED STATES PATENT OFFICE.

CHARLES F. HATHAWAY, OF FAIRPORT, NEW YORK, ASSIGNOR TO ANGULAR DRILL AND MACHINE CORPORATION, OF NEW YORK, N. Y., A CORPORATION OF NEW YORK.

SQUARE-HOLE DRILL-CHUCK.

1,299,938.   Specification of Letters Patent.   Patented Apr. 8, 1919.

Application filed August 15, 1916.   Serial No. 114,950.

*To all whom it may concern:*

Be it known that I, CHARLES F. HATHAWAY, a citizen of the United States of America, and a resident of Fairport, Monroe county, and State of New York, United States of America, have invented certain new and useful Improvements in Square-Hole Drill-Chucks, of which the following is a specification, reference being had to the accompanying drawings, forming a part thereof.

In my copending application Serial No. 856,537 filed August 13, 1914, I have shown and described a square hole drilling machine having a work holder which is adapted to be secured to the work while the hole is being made.

My present invention relates to drilling machines of the same character and one of its objects is to provide an improved work holder forming a part of the drilling machine and adapted to support the work very rigidly in position.

Another object of my invention is to provide a work holder or chuck of the character above indicated that shall comprise a relatively few number of simple parts and be inexpensive to construct.

Other objects and advantages of my invention will be set forth hereinafter, and in order that my invention may be thoroughly understood I will now proceed to describe the same in the following specification, and then point out the novel features thereof in appended claim.

Referring to the drawings:

Figure 1 is a front elevation, and

Fig. 2 is a plan view of a drilling machine and work holder or chuck embodying my invention.

A sectional plan view, taken on the line 3—3 of Fig. 1, is shown in Fig. 3.

Fig. 4 is a sectional elevation, taken on the line 4—4 of Fig. 1.

Fig. 5 is a sectional elevation at right angles to Fig. 4, taken on the line 5—5 of Fig. 4.

A sectional plan view on the line 6—6 of Fig. 5, is shown in Fig. 6.

Fig. 7 is a sectional plan view, and

Fig. 8 is a sectional elevation of an adjustable drill guide which may be substituted for that of the previous figures.

12 is a spindle which is arranged to fit into the rotary socket of a motor or drill press (not shown) and to be driven thereby. The lower end of this spindle is threaded as at 13 to support the upper end 14 of a circular guide-supporting housing 15. This housing and its upper end are connected by two posts 16 which are parallel with the axis of the spindle 12. A drill guide 20 having an annular collar 22 is mounted in a hub 23 which forms a part of the work holder. As the guide 20 is secured to the work holder and is stationary in relation to the rotary housing 15, I prefer to interpose between the upper surface of the guide collar 22 and the adjacent under surface of the housing, roller bearings 18.

The drill designated by the reference numeral 25 has an intermediate portion 26 which is triangular in section, with convex curved sides as shown in Fig. 6, a lower portion having three cutting surfaces, and an upper tapering portion which is square in section.

This upper tapering portion or shank fits into a socket or floating yoke 27 and is secured thereto by a pin or set screw indicated at 28. The socket comprises oppositely extending arms which are engaged by the posts 16, the drill being thus rotated with the spindle, but the yoke and the drill bit are free to move laterally relative to the axis of rotation.

The work holder comprises a base plate 30 having a plurality of perforated lugs 31 by which it may be bolted or screwed to any suitable surface, and a central rectangular aperture 32. Mounted on the top surface of the plate are a pair of clamping jaws 33 each having a downwardly extending lug 34 which projects into the aperture 32. These lugs are provided with tapped holes 35 through which an adjusting screw 36 extends. The screw is rotatably mounted in the plate 30 and extends across the aperture 32, being provided with left and right hand threads in a well known manner. One end 37 of the screw extends beyond the end of the base plate and is squared or otherwise adapted to receive a crank or handle (not shown) for adjusting the position of the jaws.

In addition to the base plate the work holder comprises a plurality of posts or uprights 38, a top plate 39, and a sliding yoke 40. The top plate 39, has a relatively large hole 41 through which the housing 15 extends loosely, and is mounted on the posts 38 at their upper ends. The yoke 40 is interposed between the top plate 39 and the base 30 and embodies the central hub 23 hereinbefore referred to. It also comprises sleeves 42 which are arranged to slide on the posts or uprights 38.

The operation of the apparatus is as follows:—The work is first securely clamped between the jaws 33, as indicated at 44 in Fig. 5, by suitably turning the screw 36. The spindle 12 is then lowered by advancing the socket (not shown) in which it is located. The housing 15, the floating yoke 40, and the drill bit are all forced downwardly together, the drill guide being held against rotation and supported by the yoke 40 which slides on the posts or uprights 38. When the drill is forced into engagement with the work and is rotated, a square hole will be formed in a well known manner.

Attention is particularly directed to the fact that the work holder is not an independent device, but constitutes a part of the drilling machine which is compact and portable.

Structural modifications may be effected within the spirit and scope of my invention, and I intend that only such limitations be imposed as are indicated in appended claim.

For example, the adjustable drill guide shown in Figs. 7 and 8 may be used instead of the guide 20. By this means the chuck may be adapted for use with drills varying in size over wide limits, between $\frac{1}{8}''$ and $\frac{1}{2}''$ for example.

The guide is designated 50 and comprises a cylindrical block 51 having a slot 52 extending transversely, and a hole 53 extending longitudinally through it.

Set into the slot 52 are a pair of jaws 54 and 55, having overlapping V-shaped teeth or projections which coöperate to provide a square guide hole. The size of the guide hole is determined by the relative position of the jaws and may be varied by means of an adjusting screw 56 which has oppositely threaded ends and enters tapped holes in the jaws 54 and 55.

By turning the screw the jaws are either drawn together or are forced apart.

What I claim is:

The combination with a drilling spindle, a housing secured thereto, a socket adapted to receive a drill bit and operatively but loosely connected to the housing, and a drill guide, of a work holder comprising a base plate, a pair of clamping jaws adjustably mounted thereon, posts extending upwardly therefrom, a top plate secured to the posts at their upper ends and having an opening through which the housing extends, and a yoke slidably mounted on the posts and embracing the drill guide.

In witness whereof, I have hereunto set my hand this 11th day of August, 1916.

CHARLES F. HATHAWAY.

Copies of this patent may be obtained for five cents each, by addressing the "Commissioner of Patents, Washington, D. C."